United States Patent
Ishibashi et al.

(10) Patent No.: US 8,571,589 B2
(45) Date of Patent: Oct. 29, 2013

(54) WIRELESS COMMUNICATION SYSTEM, WIRELESS COMMUNICATION METHOD, AND BASE STATION

(75) Inventors: Naomitsu Ishibashi, Yokohama (JP); Mikio Kuwahara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 655 days.

(21) Appl. No.: 12/826,140

(22) Filed: Jun. 29, 2010

(65) Prior Publication Data
US 2011/0092238 A1    Apr. 21, 2011

(30) Foreign Application Priority Data
Sep. 14, 2009    (JP) ................................ 2009-211251

(51) Int. Cl.
*H04M 1/00*    (2006.01)
*H04B 1/00*    (2006.01)
*H04B 15/00*    (2006.01)

(52) U.S. Cl.
USPC .......... 455/509; 455/562.1; 455/450; 455/62; 455/446; 455/449; 455/422.1; 455/561; 455/63.3; 455/63.4; 455/25; 455/424; 455/425

(58) Field of Classification Search
USPC .......... 455/562.1, 450, 452, 446, 449, 62, 63, 455/561, 63.3, 63.4, 25, 422.1, 424, 425
See application file for complete search history.

(56) References Cited

U.S. PATENT DOCUMENTS

| | | | |
|---|---|---|---|
| 4,590,608 A * | 5/1986 | Chen et al. ................ | 382/281 |
| 4,635,221 A * | 1/1987 | Kerr ............................ | 708/815 |
| 2006/0217158 A1* | 9/2006 | Uwano et al. ............. | 455/562.1 |
| 2007/0207838 A1 | 9/2007 | Kuwahara | |
| 2010/0046462 A1* | 2/2010 | Uwano et al. ............. | 370/329 |
| 2010/0227615 A1* | 9/2010 | Gaal et al. .................. | 455/436 |
| 2011/0299464 A1* | 12/2011 | Kuwahara et al. ......... | 370/328 |

FOREIGN PATENT DOCUMENTS

JP    2007-243258    9/2007

OTHER PUBLICATIONS

Tomcik, Jim; QFDD Technology Overview; IEEE 802.20 Working Group on Mobile Broadband Wireless Access; Nov. 2005; Slide 68; 37 pages.
3GPP; 3rd Generation Partnership Project; Technical Specification Group Radio Access Network; Evolved Universal Terrestrial Radio Access (E-UTRA) Physical Channels and Modulation (Release 8); 3GPP TS 36.211; 6.11 Synchronization signal; Mar. 2009; 42 pages.

* cited by examiner

*Primary Examiner* — Bobbak Safaipour
(74) *Attorney, Agent, or Firm* — Foley & Lardner LLP

(57) ABSTRACT

In a wireless communication system having a plurality of base stations and a control station controlling the plurality of base stations, the control station allocates, to the plurality of base stations, antenna patterns associated with directivity patterns for each of a plurality of frequency bands that can be utilized by the respective base stations and if it transmits, to respective ones of the plurality of base stations, parameters for associating the allocated antenna patterns with directivity patterns for each of the plurality of frequency bands; and the plurality of base stations associate the directivity patterns with the plurality of frequency bands on the basis of the parameters received from the control station and, in accordance with the associated directivity patterns, transmit signals to the antenna and receive signals from the antenna.

12 Claims, 15 Drawing Sheets

C~F : SDMA ANNTENA PATTERN

C~F : SDMA ANNTENA PATTERN

1~12: Beam pattern

ANNTENA PATTERN C

ANNTENA PATTERN D

ANNTENA PATTERN E

ANNTENA PATTERN F

A~D : SDMA ANNTENA PATTERN

SDMA ANNTENA PATTERN A

SDMA ANNTENA PATTERN B

| BASE STATION NUMBER | BASE STATION COORDINATES | | APPLIED WALSH FUNCTION | |
|---|---|---|---|---|
| | LONGITUDE | LATITUDE | LENGTH N | LINE NUMBER L |
| 1 | E35.372427 | N139.205760 | 8 | 2 |
| 2 | E35.375927 | N139.209260 | 8 | 3 |
| 3 | E35.379260 | N139.212593 | 16 | 1 |
| ⋮ | ⋮ | ⋮ | ⋮ | ⋮ |
| 5432 | E35.399260 | N139.232593 | 16 | 2 |

WIRELESS COMMUNICATION SYSTEM, WIRELESS COMMUNICATION METHOD, AND BASE STATION

INCORPORATION BY REFERENCE

The present application claims priority from Japanese application JP2009-211251 filed on Sep. 14, 2009, the content of which is hereby incorporated by reference into this application.

BACKGROUND OF THE INVENTION

The present invention pertains to wireless communication technology and pertains in particular to the allocation of antenna patterns in a base station that is capable of transmitting in a specific direction using a plurality of antenna elements such as an array antenna.

In cellular wireless communications, the utilization of an array antenna is considered with the objective of improving antenna gain or reducing the interference that a certain terminal causes to the communications of another terminal. With an array antenna, signals from respective antennas are transmitted or received by attaching array weights cons sting of complex numbers to a plurality of antenna elements. As a result thereof, the antenna gain is enhanced in a specific direction with respect to the respective antennas and it is possible to supply a directional pattern. This signal processing technology is called <<beam forming>>. As for the granting of array weights, it has gradually become common for it to be controlled by means of digital signal processing and array weighting is freely controlled with specific timing, so it is possible to modify the directivity of the antennas. By utilizing this technology, the antenna gain is modified adaptively with respect to the movement of users inside the cell (or sectors) covered by a base station, so adaptive array processing devised to supply a directivity pattern that is at all times optimal for the individual users also becomes possible.

In next-generation cellular wireless communication, OFDM (Orthogonal Frequency Division Multiplexing) is used as the modulation method. In OFDM, a signal is transmitted by decomposing it into mutually orthogonal frequency components by means of signal processing using FFT (Fast Fourier Transform). In wireless communication utilizing OFDM, it is possible, by providing computation in which the aforementioned array weights are added for each decomposed frequency tone, to confer a different directivity pattern for each frequency. Examples of such technology are mentioned in IEEE C802.20-05-59r1 http://ieee802.org/20/ QFDD Technology Overview Presentation (Nov. 15, 2005), Slide 68. In Slide 68, processing that changes the array weights for each user in OFDMA (Orthogonal Frequency Division Multiple Access) is disclosed.

When determining the array weights of the downlink, the communication line from a base station to a terminal, downlink information is estimated from uplink information and array weights are controlled on the basis of the result of the estimation. However, in an FDD (Frequency Division Duplex) system, it is difficult to estimate downlink information from uplink information and the implementation of adaptive array processing ensuring a good C/I (channel to interference) ratio at all times by adaptively changing the array weights is difficult. As a result, the communication environment is ensured by carrying out signal transmission or reception by changing a fixed directivity pattern temporally or frequency-wise and adapting to the timing or the frequency at which the beam is oriented in the user's own direction.

In e.g. JP-A-2007-243258, there is disclosed antenna pattern allocation technology in which, in a system constituted by a plurality of base stations, either of two orthogonal directivity patterns is appropriately allocated to the time axis or the frequency axis with respect to each base station. According to JP-A-2007-243258, signal transmission based on frequency or time for which interference from adjacent base stations is avoided becomes possible and packet scheduling in which strong interference from adjacent base stations is avoided, due to the combination with a scheduler, becomes possible.

SUMMARY OF THE INVENTION

In the prior art, there is disclosed technology up to allocating antenna patterns such as shown in JP-A-2007-243258 to a plurality of base stations, but after allocating the antenna patterns, no consideration was given regarding the case in which further a new station is installed additionally. In a wireless communication system in which antenna patterns have been allocated previously, it is necessary, in the case where a new station is installed additionally, to determine the antenna pattern so that a state is entered in which the antenna patterns of the existing base stations adjacent to the new station and of the new station to possess orthogonality and the orthogonality of the existing base stations among themselves is maintained.

The present invention is one devised to solve the aforementioned problems and has for an objective to be devised so that, in the case where a new station is installed in a wireless communication system having a state in which antenna patterns between the existing base stations that possess orthogonality are allocated, antenna pattern allocation can be carried out so that the antenna patterns between the new station and existing base stations adjacent to the new station have orthogonality.

In order to solve the aforementioned problems, the system has, in the present invention, been devised so that if, in a wireless communication system having a plurality of base stations and a control station controlling the plurality of base stations;

the control station allocates, with respect to the plurality of base stations, antenna patterns associated with directivity patterns for each of a plurality of frequency bands which can be utilized by the respective base stations and transmits parameters for associating the allocated antenna patterns with the directivity patterns for each of the plurality of frequency bands;

the plurality of base stations associate a directivity pattern with the plurality of frequency bands on the basis of the parameters received from the control station and, in accordance with the associated antenna patterns, transmit and receive signals from antennas.

For the association of the antenna patterns with the directivity patterns, there is used a Walsh function, the parameters sent to each of the plurality of base stations from the control station taken to be the length and the line number of the Walsh function.

Also, the system is devised so that, in the control station, there are stored, for the respective ones of the plurality of base stations, the identity number, positional information, Walsh function length (N); and line number (L) of the base station, and, in case there is installed a new base station in the wireless communication system, and, if the input of the identity number and positional information about the new base station is received, the base stations adjacent to the new base station and the number $N_{BSt}$ of adjacent base stations are obtained for the new base station from among the adjacent base stations, the smallest line number $L_{BSt}$ when the line number associated with the base station having $N=N_{BSt}$ is excluded is obtained, and $N_{BSt}$ and $L_{BSt}$ are transmitted to the new base station.

In addition, the system is devised so that, regarding the respective ones of the base stations adjacent to the new base station, the adjacent base stations and the number $N_{BSt}$ of adjacent base stations are obtained after installation of the new base station and, in case $N_{BSt}$ is equal to the length of the currently applicable Walsh function, the currently applicable antenna patterns are used continuously and, in case $N_{BSt}$ is not equal to the length of the Walsh function, the smallest line number $L_{BSt}$, excluding the line number allocated to the base station for which $N=N_{BSt}$, is obtained from among the adjacent base stations, and $N_{BSt}$ and $L_{BSt}$ are transmitted.

Moreover, the system is devised to use a sufficiently large value for N and to set L on the basis of the identity number of the base station.

According to the present invention, it is possible, in a state where antenna patterns possessing orthogonality between adjacent base stations are allocated, to allocate antenna patterns so that, in a state in which orthogonality is maintained between the existing base stations, the antenna patterns between the new station and the existing base stations that are adjacent to the new station have orthogonality.

Other objects, features and advantages of the invention will become apparent from the following description of the embodiments of the invention taken in conjunction with the accompanying drawings.

DETAILED DESCRIPTION OF THE INVENTION

Hereinafter, modes of implementing the present invention will be described setting forth a plurality of embodiments.

Before entering into a description of specific embodiments, there will first be given a description regarding antenna pattern allocations and the configuration of a base station controlling antenna patterns. In the embodiments hereinafter, in the case indicating a single SDMA (Spatial Division Multiple Access) beam pattern, it is referred to as a directivity pattern and where a plurality of frequency direction or time direction directivity patterns are allocated between multiple base stations, it is referred to as antenna patterns.

Figure 1:
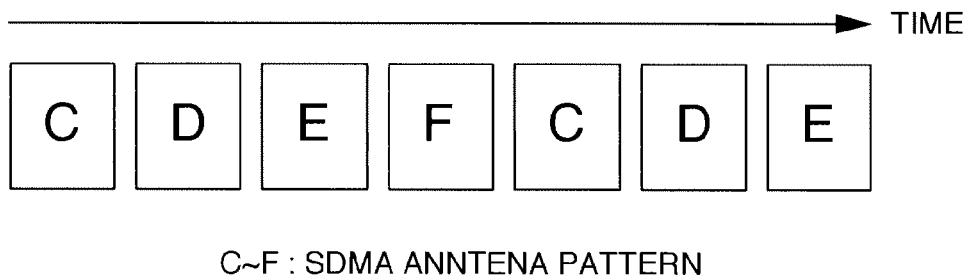
FIG. 1 is a diagram for describing an example of antenna pattern allocation in a narrow-band system.

FIG. 1 is a diagram for describing an example of antenna pattern allocation in a narrow-band system.

Figure 2:
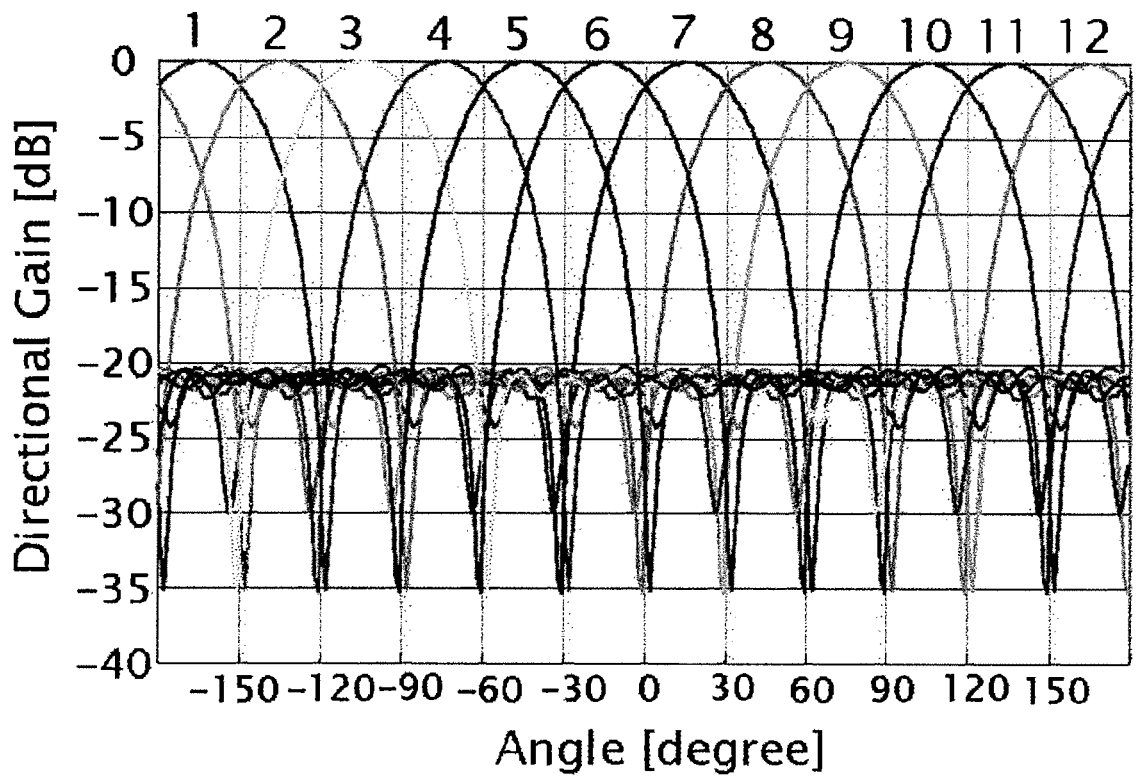
FIG. 2 is a diagram for describing an example of array antenna beam forming.
Figure 3A:
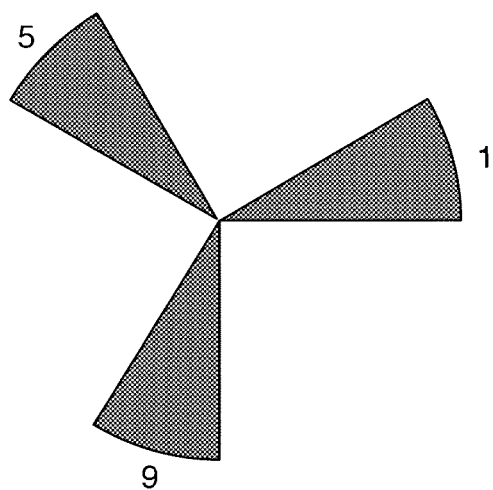
FIGS. 3A to 3D are diagrams for describing antenna patterns in a spatial plane.
Figure 3B:
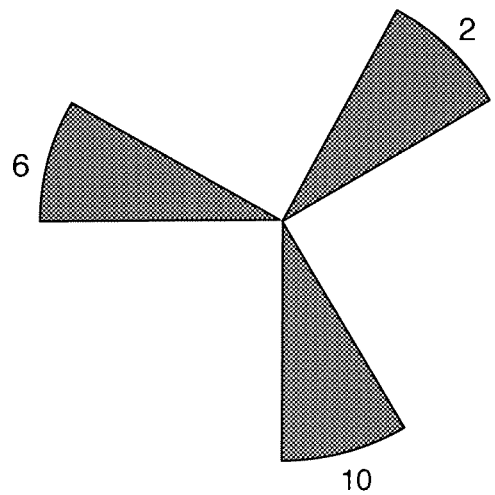
Figure 3C:
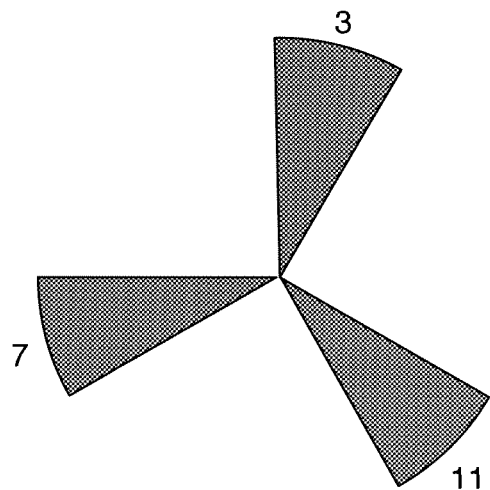
Figure 3D:
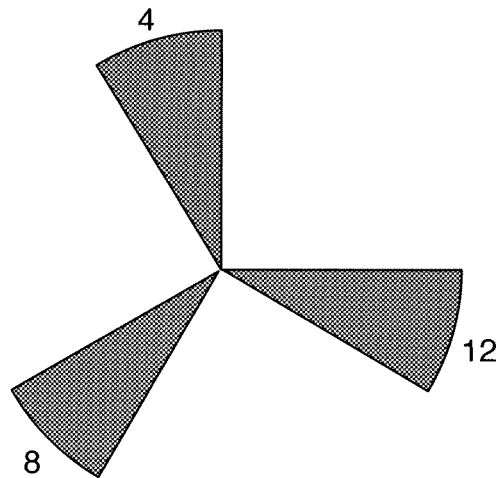

FIG. 2 is a diagram for describing an example of array antenna beam forming.

FIGS. 3A to 3D are diagrams for describing an example of directivity patterns in a spatial plane.

Here, narrow-band communication is assumed. The abscissa of FIG. 1 represents time and the symbols C to F indicate spatial division multiple access (SDMA) directivity patterns. SDMA is a technology in which communication is carried out by utilizing antenna directivity and dividing space. If there is used an array antenna capable of forming 12 separate fixed beams such as shown in FIG. 2, it is possible to form, as SDMA directivity patterns, four types of directivity patterns creating beam peaks in three directions such as shown in FIGS. 3A to 3D. In each of the directivity patterns in FIGS. 3A to 3D, three beams are transmitted simultaneously. E.g., in directivity pattern C, beams 1, 5, and 9 are transmitted simultaneously. With beams 1, 5 and 9, the respective beams being oriented toward different terminals and the respective ones transmitting different information.

Next, a description will be given regarding the configuration of a base station simultaneously transmitting beams in three directions such as mentioned above.

Figure 4:
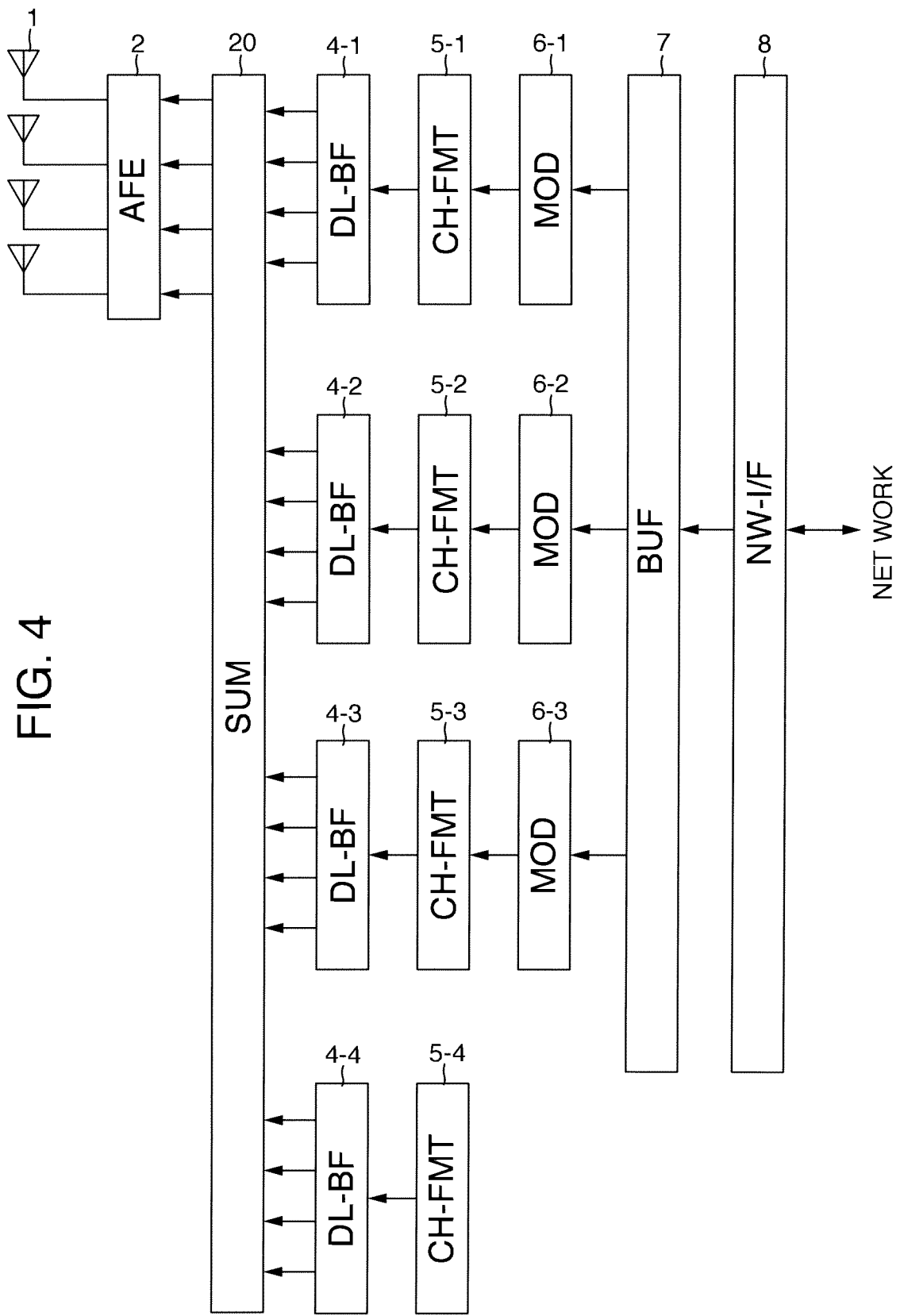
FIG. 4 is a diagram showing a configuration example of a signal processing part of a base station in a narrow-band system.

FIG. 4 is a diagram showing a configuration example of a signal processing part of a base station.

FIG. 4 shows a configuration example of the transmission part baseband processing simultaneously transmitting at most three signals.

A network interface 8 is connected with a network, receives information that is gradually transmitted via the network, and stores it in a buffer 7. The transmission timing and modulation method for the stored information are determined by a (not illustrated) scheduler. The scheduler utilizes channel state information (CSI) reported from a terminal and determines a modulation method in response to information such as CSI quality (C/I) and needs (real time communication or non real time communication). Also, the scheduler determines the transmission timing of each information item on the basis of the order of priority for each session and the CSI. E.g., the scheduler determines the transmission timing by taking into accounts needs such as whether there is real time communication, based on a scheduling algorithm such as "proportional fairness". At this juncture, since the beams that can be transmitted are predetermined, as indicated in FIG. 1, the scheduler, after selecting the users to whom to transmit on the basis of the beams planned for transmission, operates a scheduling algorithm such as "proportional fairness" mentioned above.

The transmission information in which the modulation method and the timing are determined by the scheduler is extracted from buffer 7 and channel encoding and mapping processing et cetera for 64QAM (64-level Quadrature Amplitude Modulation) or the like is carried out by encoding parts 6. Here, multiple encoding parts, such as 6-1 to 6-3, are prepared a maximum of three signals being processed in parallel in the example of FIG. 4. The signals processed by encoding parts 6-1 to 6-3 are next input into channel forming parts 5-1 to 5-3 and additional information such as a packet signal or separate control channels is added. In channel forming parts 5, there is a channel forming part 5-4 for sending common information within the cell, so four signals are generated simultaneously. The respective signals are converted into signals for each antenna in which array weights that are needed for forming beams by downlink beam forming parts 4-1 to 4-4 have been added. The same signals are, for each antenna, added and the four signals (three user signals and one common control signal) are combined into one, in a signal combining part 20. The combined signals for each antenna are transmitted from an antenna 1 after passing through analog conversion or frequency conversion in an analog front end part 2 and appropriate signal amplification processing has been carried out.

By this kind of processing, it is possible to generate information in accordance with each of the SDMA directivity patterns in parallel, combine it, and transmit it from the antenna. Each beam is designed so that the side lobes are restrained to e.g. −20 dB outside the main beam direction, the D/U (desired-to-undesired) ratio, which is the power ratio between the desired waves and the interference waves, taking on a sufficiently high value. As a result hereof, even if three beams are transmitted simultaneously, a D/U ratio on the order of −17 dB can be scored, making it possible to implement SDMA.

At this stage, supposing that a certain base station is only transmitting antenna pattern C, the result is that it is only performing good communication with users in a specific direction. Accordingly, by modifying the SDMA pattern temporally, it becomes possible to communicate with respect to users in the direction of any of the 12 beams. If one returns to FIG. 1, in this example, the SDMA directivity patterns are changed from C to D, from D to E, from E to F, and from F to C in a determined time interval. If the base station is viewed from above, beams transmitting signals in three directions supply beams to the entire cell while rotating like a propeller turning counter clockwise in response to changes in time. However, if proceeding in this way, after transmitting pattern C, transmission with pattern C is not carried out again before a certain fixed time has passed. In that case, the interval in which a packet ends up getting vacant, becoming a cause for transmission delay. Also, the determination of the signal transmission timing is, as mentioned above, carried out by the scheduler on the basis of information about the channel estimation results gradually being transmitted from the users. Even if the terminal for that reason carries out channel estimation during transmission based on pattern C, since it takes some time before information is subsequently transmitted with pattern C, it may be that the state of the channel changes during that time. In particular, in case the terminal moves at a high speed, this problem occurs easily, so the scheduler does not function validly anymore.

Accordingly, a description is given of antenna pattern allocation in a broad-band system having a broadening in the frequency domain.

Figure 5:
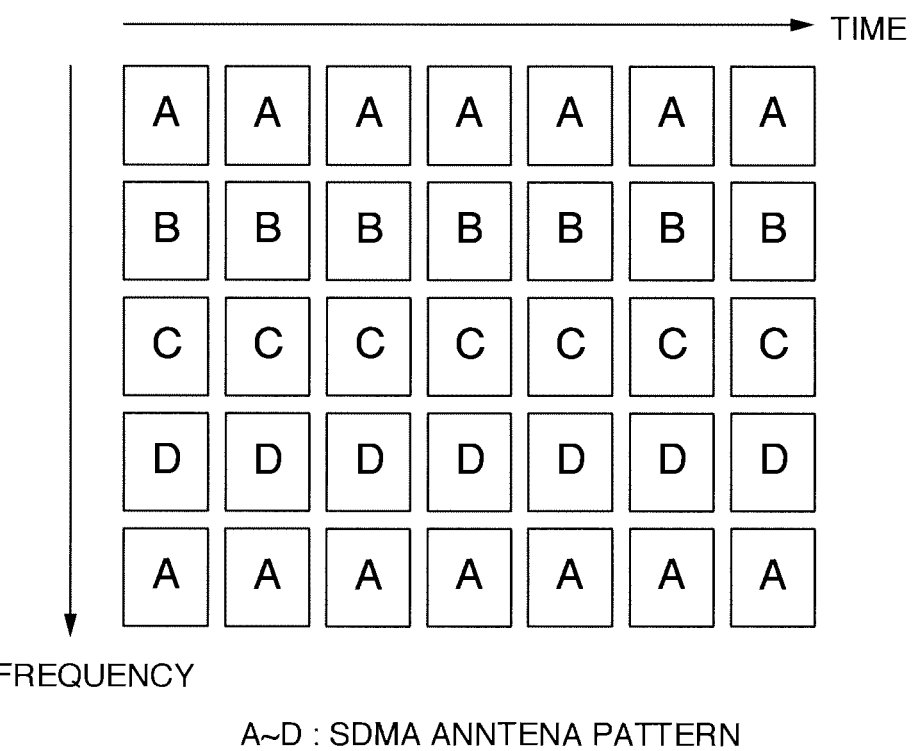
FIG. 5 is an example of antenna pattern allocation in a broad-band system.

FIG. 5 is a diagram for describing an example of antenna pattern allocation in a broad-band system.

In FIG. 5, the abscissa represents time and the ordinate represents frequency. In this example, different directivity patterns are allocated for each frequency and transmission is performed with fixed directivity patterns at specific frequencies. By proceeding in this way, similarly to when antenna patterns are allocated in the time domain, it is possible to communicate to user in the direction of any of the 12 beams, and since the directivity pattern is fixed for a specific frequency, the aforementioned problems of transmission delay and channel estimation time delay do not arise, either.

Figure 6:
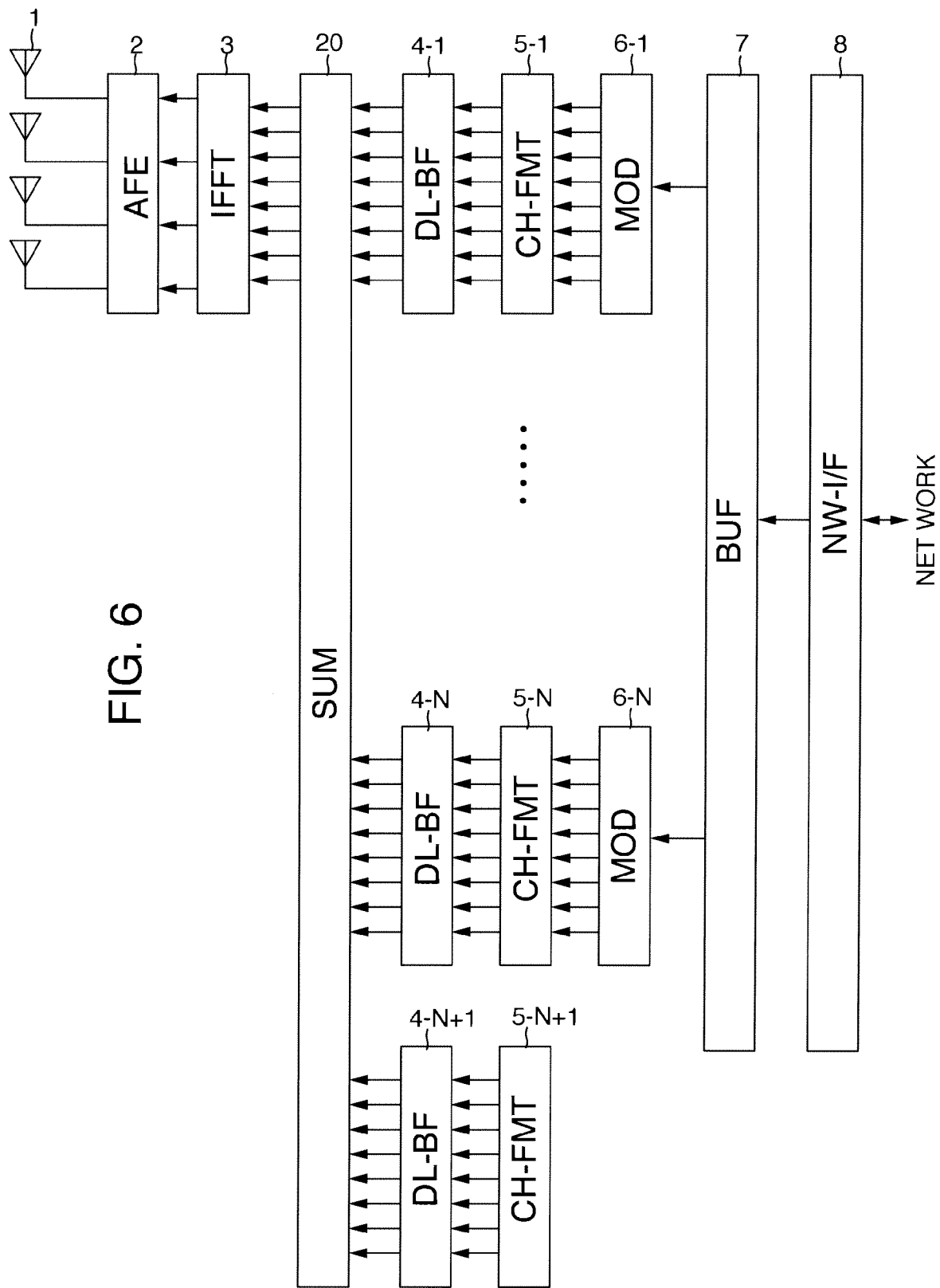
FIG. 6 is a diagram showing a configuration example of a signal processing part of a base station in a narrow-band system.

In FIG. 6, there is shown a configuration example of a signal processing part of a base station simultaneously transmitting beams in three directions, in a broad-band system.

FIG. 6 is a diagram showing a configuration example of the transmission part baseband processing of an OFDMA-based base station simultaneous transmitting at most N signals. Network interface 8 is connected with the network, receives information gradually sent via the network, and stores it in buffer 7. The transmission timing and modulation method of the stored information are determined by a (not illustrated) scheduler. Regarding the modulation method associated with the scheduler, the transmission timing, the selection of users to whom to transmit on the basis of the beams planned for transmission, and scheduling operation based on a scheduling algorithm such as "proportional fairness", the contents are the same as those described in FIG. 4.

The transmission information determined by the scheduler is extracted from buffer 7 and channel encoding and mapping processing et cetera for 64QAM (64-level Quadrature Amplitude Modulation) or the like is carried out by encoding parts 6. Here, multiple encoding parts, such as 6-1 to 6-N, are prepared, and in the case of adopting the SDMA patterns of FIGS. 3A to 3D, signal processing is executed simultaneously for a maximum of three users at the same frequency. The signals processed by encoding parts 6-1 to 6-N are next input into channel forming parts 5-1 to 5-N and additional information such as a packet signal or a separate control channel is added. To channel forming parts 5-1 to 5-N, there is newly added a channel forming part 5-(N+1) for sending common information within the cell. The respective signals have array weights that are needed for forming beams by downlink beam forming parts 4-1 to 4-(N+1) added thereto and are converted into signals for each antenna and each sub-carrier. Next, in a signal combining part 20, the N+1 signals are added and combined into one for each antenna and sub-carrier. The combined signals for each antenna and sub-carrier are converted from frequency domain information to time domain information in an IFFT (Inverse Fast Fourier Transform) part 3 to become information for each antenna. The time domain signals for each antenna are transmitted from an antenna 1 after passing through analog conversion or frequency conversion in an analog front end part 2 and appropriate signal amplification has been carried out.

Hereinafter, a description of the downlink will be given. In wireless communication utilizing CDMA (Code Division Multiple Access) or OFDMA, operation in which frequency reuse is 1 or close to 1 is normally carried out. A reuse of 1 refers to a situation in which two adjacent base stations utilize the same frequency. The C/I ratio on the terminal side is determined by the transmission power from the base station, the interference signal power and the thermal noise power that the terminal has. As part hereof, for the interference signal power of a certain terminal, there are included, in addition to signals from other sectors of the same base station and beams oriented at other users that are formed with the array antenna of the same base station, signals from adjacent base stations. Consequently, on the occasion of allocating antenna patterns to a base station, allocation of antenna patterns also taking into account interference from adjacent base stations becomes necessary.

The inventors of the present invention have disclosed technology in which, in a system consisting of a plurality of base stations, such as that mentioned in JP-A-2007-243258, either of two orthogonal directivity patterns is appropriately allocated to each base station on the time axis or the frequency axis. In this way, signal transmission based on a frequency or a time for which interference from adjacent base stations is avoided becomes possible and, based on combination with the scheduler, packet scheduling avoiding strong interference from adjacent base stations becomes possible. However, regarding all the base stations inside a wireless communication system, even if it is chosen to allocate antenna patterns so that directivity patterns among adjacent base stations are orthogonal, it becomes necessary, in the case where a new station is additionally installed, to make changes in antenna patterns of adjacent base stations so that antenna patterns have orthogonality in the new station and adjacent base stations. Since the change of antenna patterns of adjacent base stations further exerts an influence on adjacent-but-one base stations, it is possible that one ends up changing the antenna patterns of the base stations of the entire wireless communication system.

The present invention is one that, in a wireless communication system in which antenna patterns have already been allocated, offers a method of determining, in the case where a new station is installed, the antenna pattern of the new station so that the state becomes one in which the antenna patterns of the existing base stations adjacent to the new station and of the new station possess orthogonality and the orthogonality between existing base stations is maintained, and has the following characteristics.

Since different antenna patterns are associated between adjacent base stations, when adding a new station and with the prior condition that a randomization of antenna patterns between base stations is implemented using the Walsh function disclosed in JP-A-2007-243258, there is, with respect to base stations for which the number of adjacent stations is increased by the addition of the new station, carried out an association of a directivity pattern with each frequency using a Walsh function with a code length that is longer than the number of adjacent stations after the addition. Further, with respect to the stations for which the number of adjacent base stations increases, the frequency division number is increased and signal transmission or reception is carried out by associating the increased frequencies with directivity patterns.

Alternatively, with respect to the stations for which the number of adjacent base stations increases due to the addition of the new station, there is carried out an association of a frequency or a time with a directivity pattern using a Walsh function which is longer than the number of adjacent stations after the addition. Stated in greater detail, the length and line number of the Walsh function associated with each base station are determined in a control station, which is connected with a plurality of base station devices via the network and making it possible to carry out information exchange with the base stations, and notified to each base station. Each base station receiving the Walsh function length and line number from the control station determines, using the same values, an antenna pattern associated with the base station.

Also, in case the number of antenna patterns determined from the length of the Walsh function is sufficiently great compared to the number of adjacent base stations, the base station determines the line number of the Walsh matrix on the basis of a number allotted uniquely for each base station, instead of receiving it from the control station.

In addition, the base stations carry out direct communication between themselves and search for antenna patterns that are orthogonal to those of the adjacent base stations.

Hereinafter, a description will be given citing a specific embodiment.

First Embodiment

First, a description of Embodiment 1 will be given.

Figure 7:
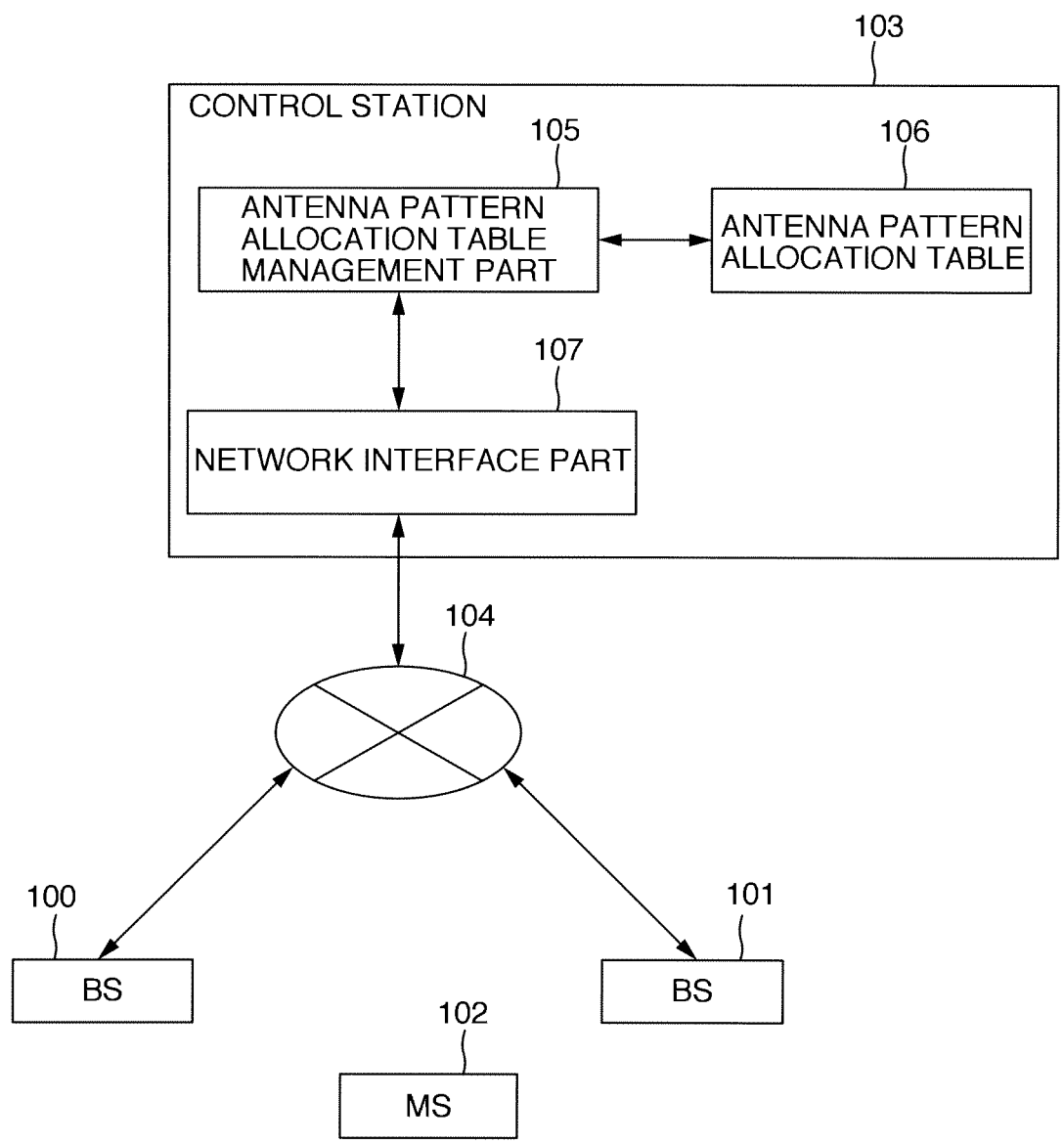
FIG. 7 is a diagram showing a configuration example of a wireless communication system in an embodiment of the present invention.

In FIG. 7, there is shown a configuration example of a wireless communication system an embodiment of the present invention.

In FIG. 7, a plurality of base stations 100, 101 are connected with a network 104. The respective base stations have antenna patterns assigned by control from a control station 103. In Embodiment 1, control station 103 determines the antenna patterns of base stations 100, 101, and transmits antenna pattern allocation commands and parameters needed for associating antenna patterns with directivity patterns to base stations 100, 101. In control station 103, there are provided: an antenna pattern allocation table 106 holding data pertaining to antenna pattern allocations et cetera of all base stations; a network interface part 107 using this table; and an antenna pattern allocation table management part 105 carrying out antenna pattern allocation to each base station via network 104. Base stations 100, 101 associate antenna patterns with specific directivity patterns on the basis of antenna pattern allocation commands received from control station 103, and parameters, and carry out control of beams transmitted from the antenna. In Embodiment 1, Walsh function lengths and line numbers are transmitted as parameters from control station 103 to base stations 100, 101.

Figure 8A:
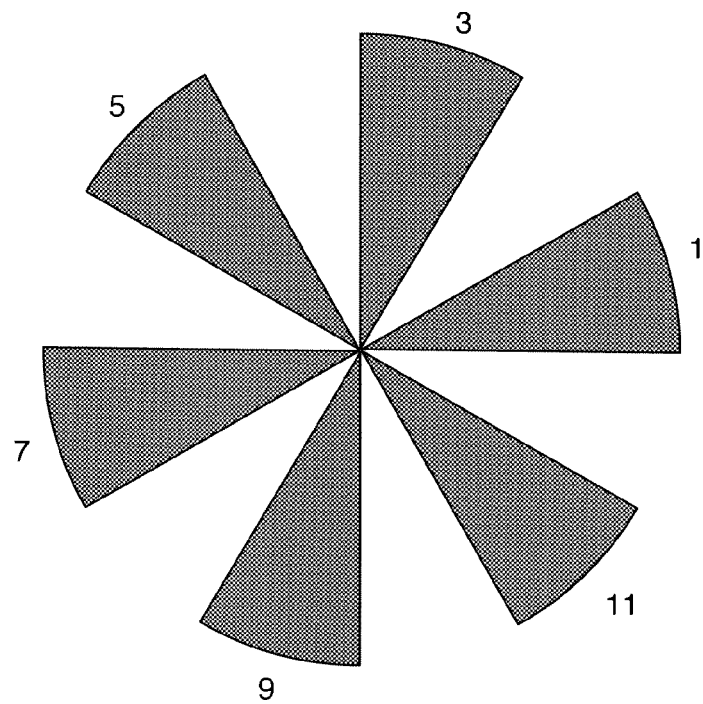
FIGS. 8A and 8B are diagrams showing examples of directivity patterns in an embodiment of the present invention.
Figure 8B:
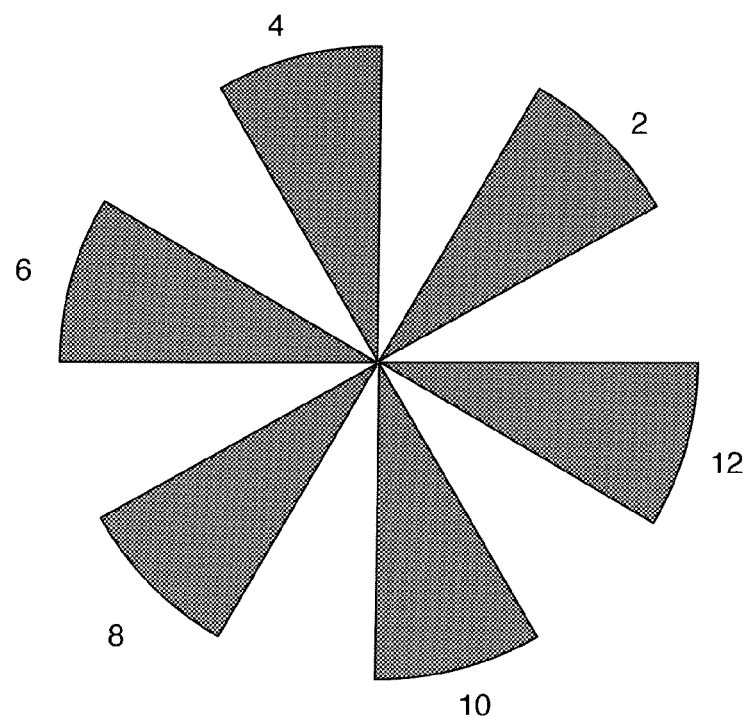

FIGS. 8A and 8B are diagrams showing examples of directivity patterns in Embodiment 1 of the present invention.

As shown in FIGS. 8A and 8B, in Embodiment 1, a description is given for a system in which six beams, from among twelve beams, are transmitted simultaneously.

Figure 9A:
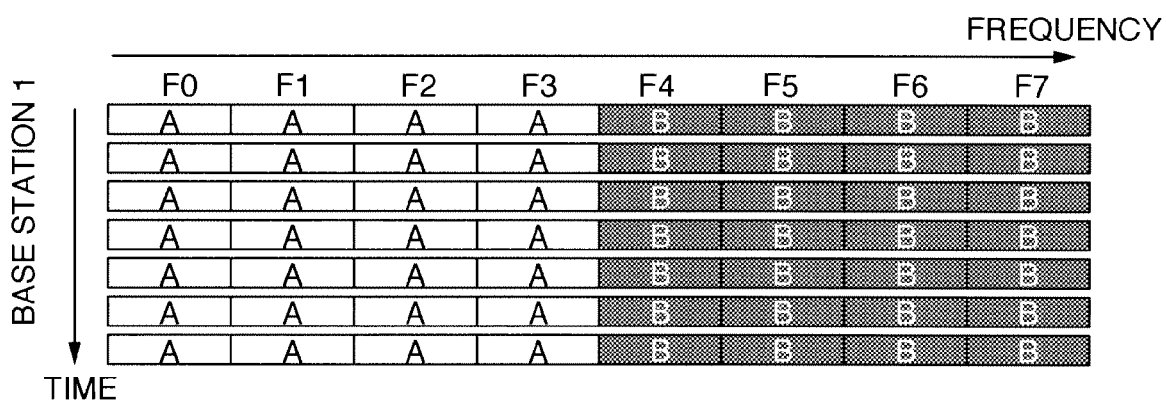
FIGS. 9A and 9B are diagrams showing examples of two adjacent base stations in an embodiment of the present invention.
Figure 9B:
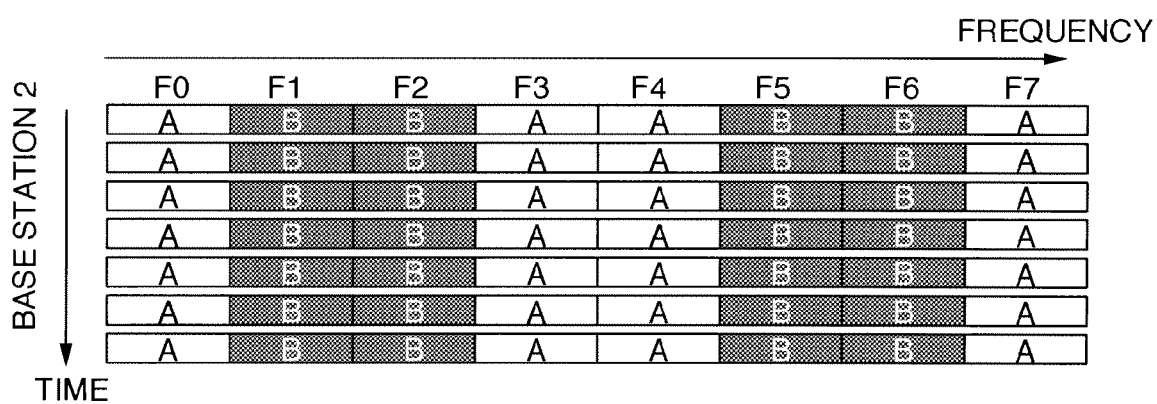

FIGS. 9A and 9B are diagrams describing antenna patterns of two adjacent base stations in Embodiment 1. FIG. 9A shows a beam directivity pattern pertaining to base station 1. The abscissa represents frequency, there being prepared eight frequency channels, from F0 to F7. The ordinate represents time and indicates that the beam directivity patterns do not change over time. Reference A or B in the boxes indicates a situation in which a signal is transmitted at a corresponding frequency using antenna directivity pattern A or antenna directivity pattern B shown in FIGS. 8A and 8B.

In FIGS. 9A and 9B, the SDMA directivity patterns are set to differ by frequency among adjacent base stations. By making a decision in this way so that the directivity patterns differ for each frequency between adjacent base stations, it is possible to randomize the influence of interference beams from adjacent stations.

A description will be given in detail regarding the randomization of interference. There is considered a user who is carrying out communication with base station 1 utilizing e.g. a directivity pattern A and for whom transmission based on directivity pattern A of base station 2 becomes a strong interference beam. Regarding base station 1, it transmits, from among frequencies F0 to F7 in FIGS. 9A and 9B, a signal with a directivity pattern A having F0 up to F3, which is a directivity pattern that is convenient for the user. Regarding base station 2, it transmits with directivity pattern B having F1, F2, F5, and F6 which is a directivity pattern that is convenient for the user. Consequently, due to the fact that this user preferentially utilizes F1 or F2, he can communicate avoiding the influence from the adjacent base station. Regarding frequencies other than these, it is not possible to obtain good communication quality because there occur things like the signal expected from base station 1 not arriving or the interference signal from base station 2 being strong. In this way, by modifying, for each base station, the directivity pattern of the antenna for each frequency to generate a good situation in which interference does not occur and a deteriorated situation in which interference occurs strongly is called randomization. After randomization has been carried out, interference avoidance is carried out by selectively by using good frequencies at which interference does not occur.

As mentioned above, in the randomization process, directivity pattern allocation that differs for each frequency or each time becomes necessary in the respective base stations. As a result, in order to determine the directivity pattern to be allocated, a Walsh function is used. Hereby, interference beams from adjacent base stations are pseudo randomized.

If one takes a certain terminal, at the frequency (or the time) at which a beam is oriented toward it, the result is that there are generated a frequency (or time) at which interference occurs from a base station causing strong interference and a frequency (or time) at which interference is avoided is generated, there occurring a great dispersion in the state of the channel. Since the scheduler carries out channel allocation in response to the channel state, it is possible, by preferentially selecting a frequency (or a time) at which interference small, to avoid interference. As a result of allocating frequencies for each terminal for which interference is difficult to receive, it is possible to enhance the communication capacity for the whole base station and also, for the entire communication system.

In FIGS. 8A and 8B, antenna pattern A (1, 3, 5, 7, 9, and 11) and antenna pattern B (2, 4, 6, 8, 10, and 12) indicate directivity patterns in which a signal is simultaneously transmitted in respectively six directions.

Figure 10:
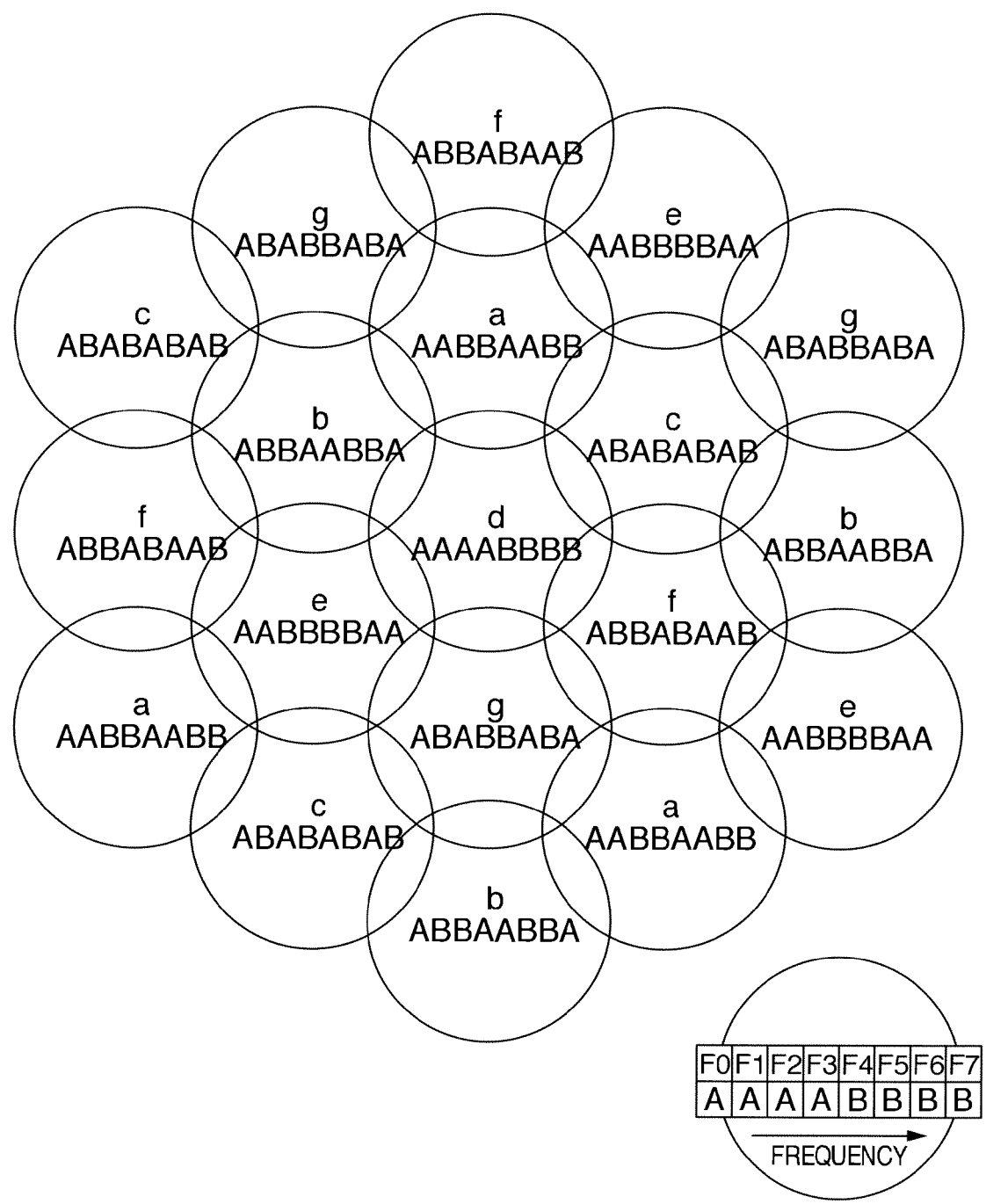
FIG. 10 is a diagram describing an example of allocating antenna patterns to multiple base stations.

In FIG. 10, there is shown an example in which antenna patterns are allocated to a plurality of base stations using a Walsh function.

The circles of FIG. 10 indicate the service area (cell) of each base station. Base stations are arranged at the centers of the circles. A description will e.g. be given for the cell in the center of the diagram that is marked with "d". The mention "AAAABBBB" listed within the cell indicates, as mentioned at the bottom right, the correspondence of frequencies and directivity patterns. What are shown are the directivity patterns in each frequency band, in ascending order of frequencies from the left.

I.e., it indicates that the antenna patterns are allocated as follows:

Frequency F0—Pattern A,
Frequency F1—Pattern A,
Frequency F2—Pattern A,
Frequency F3—Pattern A,
Frequency F4—Pattern B,
Frequency F5—Pattern B,
Frequency F6—Pattern B, and
Frequency F7—Pattern B.

This combination of frequencies and directivity patterns is called "Pattern d". If one looks at the periphery of Pattern d, combined patterns other than Pattern d enclose the perimeter, Pattern d not being present in the cells adjacent to the Pattern d cell. If one looks at one pattern of the surrounding cells, in e.g. "Pattern a", the antenna patterns take on combinations that differ from Pattern d, as follows:

Frequency F0—Pattern A,
Frequency F1—Pattern A,
Frequency F2—Pattern B,
Frequency F3—Pattern B,
Frequency F4—Pattern A,
Frequency F5—Pattern A,
Frequency F6—Pattern B, and
Frequency F7—Pattern B;

so it comes about that the influence of interference beams can be avoided in adjacent cells. The system is designed so that this relationship holds true for any two patterns, from Pattern a to Pattern g. Accordingly, whichever cell one looks at, there necessarily exists a frequency for which the influence due to an interference beam from an adjacent cell is avoided, so by the scheduler's selecting an appropriate frequency, it becomes possible to avoid the influence of an interference beam from an adjacent cell.

In the present embodiment, a Walsh function is utilized for the association of frequencies and directivity patterns. If a Walsh function with length N is utilized, it is possible to make associations with N−1 directivity patterns. E.g., in the case where N=4, four Walsh codes, "1111", "1100", "1001", and "1010", can be generated. Since the first one, "1111", only consists of 1's, this is removed, the antenna patterns being designed with the three codes "1100", "1001", and "1010". As for the directivity patterns, in the case of two independent patterns such as shown in FIGS. 8A and 8B, the antenna pattern design is completed by substituting directivity pattern A for "1" and directivity pattern B for "0". That is to say that they are "AABB", "ABBA", and "ABAB".

In the example shown in FIG. 10, all the cells are respectively adjacent to six cells, so the repetition of a total of seven antenna patterns becomes necessary. In the present embodiment, the design of a total of seven antenna patterns is carried out using N=8 Walsh functions. By proceeding in this way, it becomes possible to devise the system so that the antenna patterns between a certain cell and its six adjacent cells are different, by designing the necessary seven antenna patterns in the example shown in FIG. 10. In this way, for the allocation of antenna patterns in each cell there may be used a Walsh function with a length that is sufficient to generate a few antenna patterns of a certain cell and cells that are adjacent thereto. Specifically, as mentioned above, since, from among the patterns generated by Walsh codes, the first one has all 1's, this one is removed. Also, there are chosen Walsh functions with a length satisfying $N=2^k$ ($k=0, 1, 2, \ldots$). Accordingly, in case the number of cells that are adjacent to a given cell is M, there is selected a Walsh function having a length satisfying the condition of being the smallest $2^k$ ($k=0, 1, 2, \ldots$) that is equal to or greater than M+2 and the allocation of antenna patterns of a certain cell and its adjacent cells may be carried out using this.

Next, a description will be given regarding the case of adding a new station.

Figure 11:
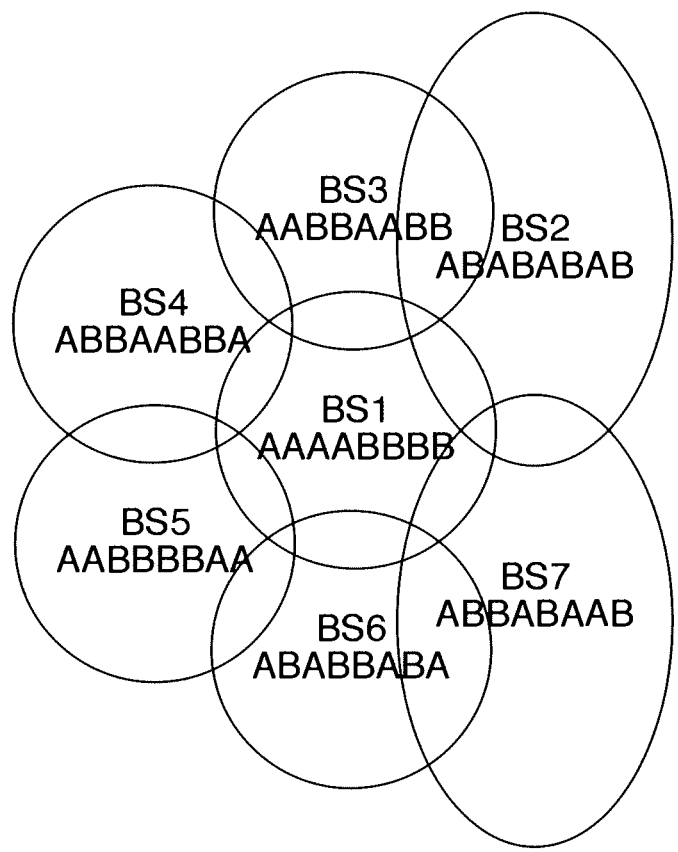
FIG. 11 is a diagram describing the antenna pattern of each base station before a new station is added in an embodiment of the present invention.

In FIG. 11, there is shown the antenna pattern of each cell before a new station is added, in Embodiment 1.

As shown in FIG. 11, in the present embodiment, it is assumed that, in a certain area, there is a base station BS1 whose cell is adjacent to six cells.

In FIG. 11, from the explanation above, an N=8 Walsh function is used for the allocation of antenna patterns with respect to BS1, since the number of adjacent cells of base station BS1 is 6. Although not illustrated in the present diagram, the six cells that are adjacent to that of BS1 are also respectively adjacent to a plurality of cells for which allocation of antenna patterns is carried out using N=8 Walsh functions.

Figure 12:
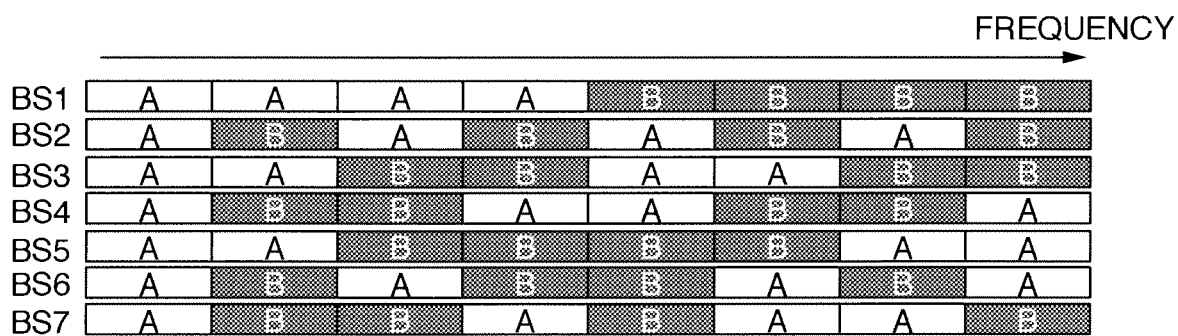
FIG. 12 is a diagram expressing, on the frequency axis, the antenna pattern of each base station before a new station is added in an embodiment of the present invention.

In FIG. 12, there is shown a diagram where the antenna pattern of each cell in FIG. 11 is displayed on the frequency axis.

In the present diagram, the ordinate represents base stations BS1 to BS7 and the abscissa represents the directivity pattern allocation for each frequency in each base station.

Here, it is assumed that, with a BS8 taken to be a new station, the cell of BS8 is additionally installed to be adjacent to the respective cells of BS1, BS2, and BS7, which are existing base stations.

Figure 13:
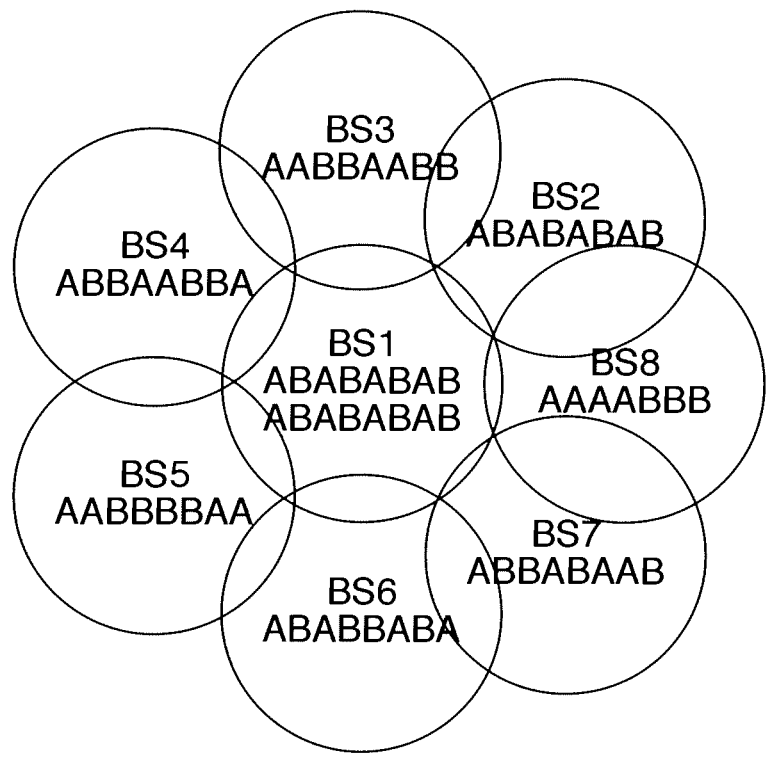
FIG. 13 is a diagram describing the antenna pattern of each base station after a new station has been added in an embodiment of the present invention.

In FIG. 13, there is shown a base station antenna pattern after the new station has been added.

As a result of the new station's having been added, the number of adjacent cells of BS1 is increased from 6 to 7, as shown in FIG. 13. Hereby, it comes about that the number of adjacent cells of BS1 exceeds 6, the maximum number of adjacent cells with which allocation with the N=8 Walsh function used so far for the antenna pattern allocation of BS1 is possible. Accordingly, in the present embodiment, there is first carried out an antenna pattern allocation for a second time with respect to BS1, as described below.

As mentioned above, regarding BS1 for which the adjacent cell number becomes 7, there is selected a Walsh function with a length N=16 which satisfies the condition of being the lowest $2^k$ expression being equal to or greater than 7+2. And then, as shown in FIG. 14, the number of frequency divisions of BS1 is doubled from 8 to 16 (halving the bandwidth) and antenna pattern allocation is carried out for each frequency.

Regarding all the existing base stations, including cells not illustrated in FIG. 13, for which the number of adjacent cells is increasing due to the fact of being adjacent to BS8, the new station, antenna pattern allocation is in the same way carried out for a second time, in case the number of adjacent cells after the increase exceeds the maximum number of adjacent cells that is possible with allocation with the Walsh function used for the current antenna pattern allocation.

Figure 14:
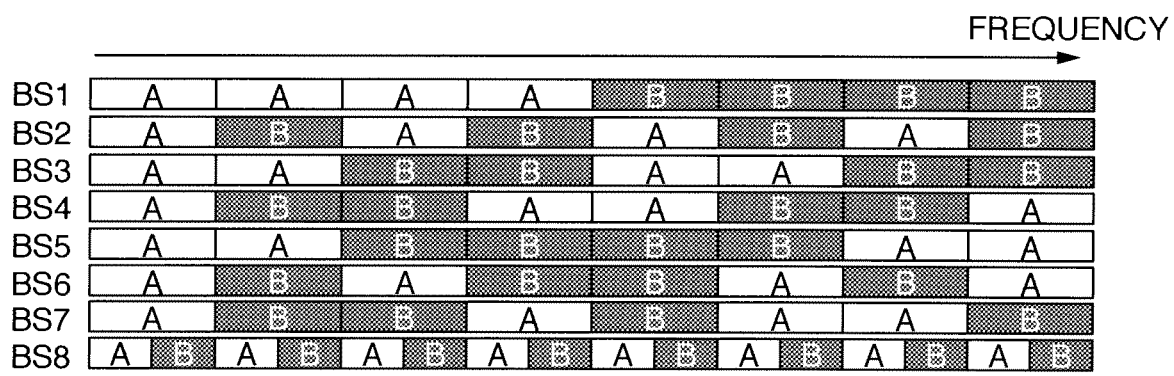
FIG. 14 is a diagram showing an example of allocating antenna patterns to each base station after a new station has been installed additionally in an embodiment of the present invention.

In FIG. 14, there is shown an allocation of antenna patterns to each cell after the new station has been installed additionally.

The antenna pattern allocation result with respect to each frequency of each BS after BS8, the new station, has been installed additionally is as shown in FIG. 14. It is seen that hereby, a new station installation is implemented in a state in which the newly additionally installed base station possesses antenna pattern orthogonality with adjacent existing base stations and the orthogonality among existing base stations is also maintained.

Figures 15, 16:
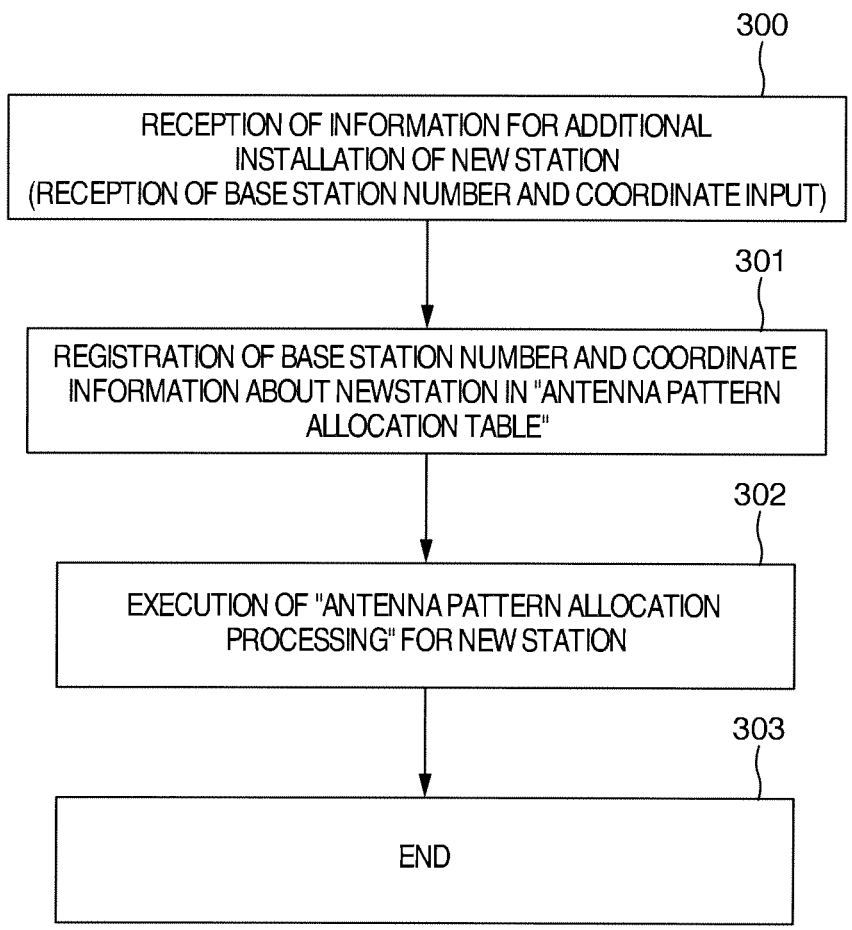
FIG. 15 is a diagram showing an antenna pattern allocation data format example.
FIG. 16 is a flowchart of additional installation processing for a new station.
Figure 17:
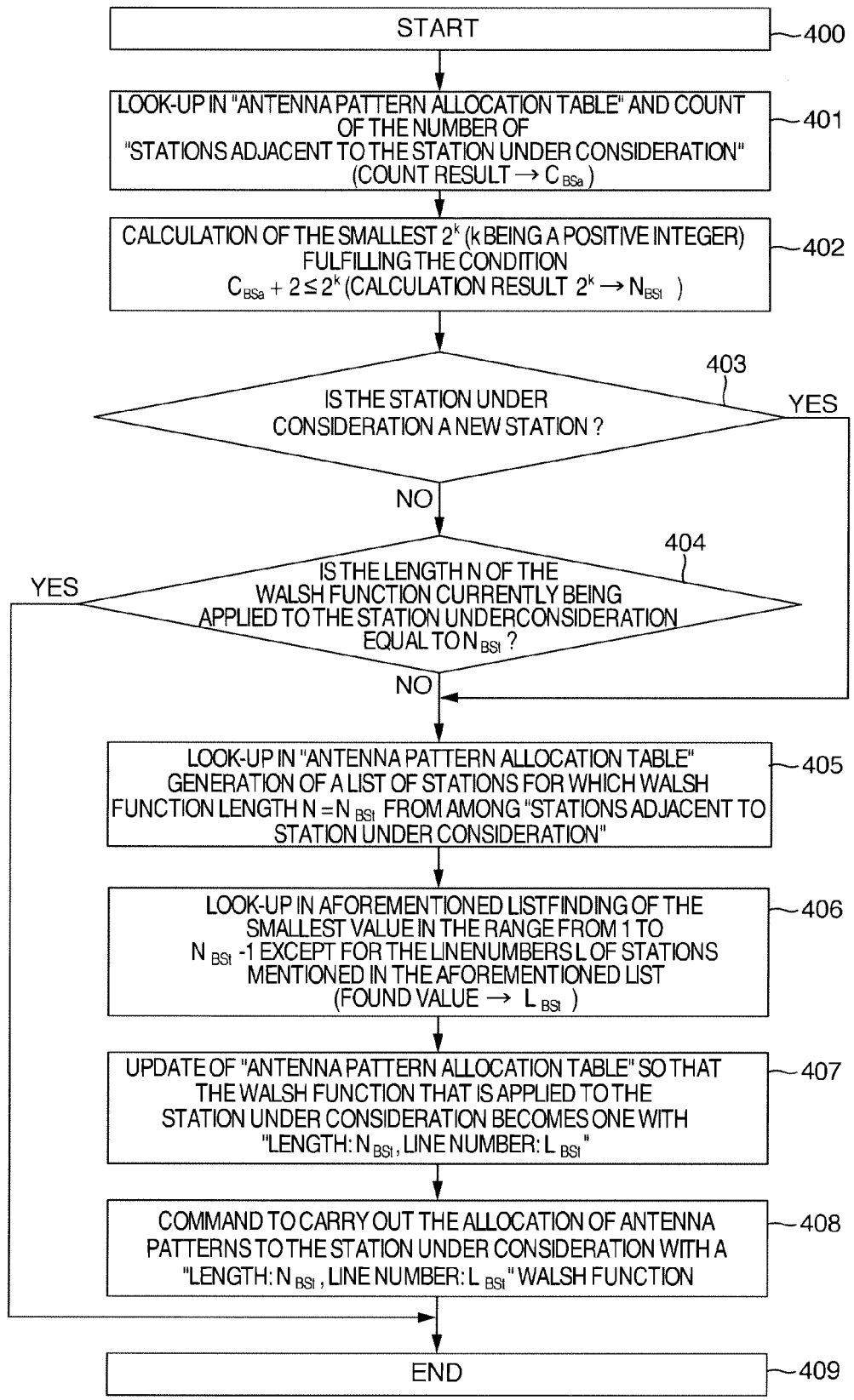
FIG. 17 is a flowchart of antenna pattern allocation processing.

In the case, described above, of a new station being installed additionally, an explanation is given specifically using FIG. 15, FIG. 16, and FIG. 17 regarding the antenna allocation processing carried out by control station 103.

In FIG. 15, there is shown a configuration example of an antenna pattern allocation table of the control station.

Antenna pattern allocation table 106 of the control station is composed of: a base station number 200 that is allocated to a base station for the purpose of identifying each base station in a wireless communication system; base station coordinates 201 taking as their reference the antenna position of the same base station; the Walsh function 202 with length N that is currently applied for the antenna pattern allocation of the same base station; and a matrix line number L 203. Further, the range of line numbers L is 1 to N−1.

Using FIG. 16 and FIG. 17, an explanation will be given of the operating flow of an antenna pattern allocation table management part 105 executed in the control station in case a new station is installed additionally. First, by a maintenance staff member's carrying out processing such as inputting using a keyboard, antenna pattern allocation table management part 105 receives the base station number and coordinate information of the base station to be newly installed. When the information about the additional installation of a base station is received (Step 300), the received base station number and coordinate information about the new station is registered in an antenna pattern allocation table 106 (Step 301).

Next, the antenna pattern allocation process is carried out with respect to the new station (Step 302). A description regarding the present process will be given using FIG. 17.

First, antenna pattern allocation table 106 is looked up and the distance between the coordinates of the new station and the base station coordinates listed in the table is calculated, a base station being considered as an adjacent base station if the distance between the base stations is equal to or less than a value obtained by multiplying the minimum distance to a base station by a fixed index (e.g. 1.5), and the number $C_{BSa}$ of base stations that will be adjacent is counted (Step 401). The smallest positive integer k satisfying the condition that $C_{BSa}+2 \leq 2^k$ is found and the length of the Walsh function applied to the new station is found as $N_{BSt}=2^k$ (Step 402). Antenna pattern allocation table 106 is looked up once again and there is generated a list (Step 405) of stations, among the existing base stations found to be adjacent to the view station, for which the Walsh function length $N=N_{BSt}$. Looking up the present list, in the range 1 to $N_{BSt}-1$, the smallest value within the range apart from the line number L of the stations mentioned in this list is found and this is taken to be (Step 406) the line number $L_{BSt}$ of the Walsh function applied to the new station. Specifically, an explanation will be given using numerical values. First, as a result of computing $C_{BSa}$, there are taken to be seven stations. In Step 402, the length $N_{BSt}$ of the Walsh function is determined to be 16. If the Walsh functions used on the periphery are only ones having a length of 8, as shown in FIG. 14, even if any line of a newly created Walsh function with length 16 is used, it can be made to be orthogonal with the other functions. In case e.g. a series of first and fourth lines of a Walsh function with length 16 is already used in adjacent stations, it is avoided to select the same lines, and by selecting e.g. the second line, it is possible to implement an allocation that is orthogonal with any of the base station antenna patterns on the periphery.

Figure 18:
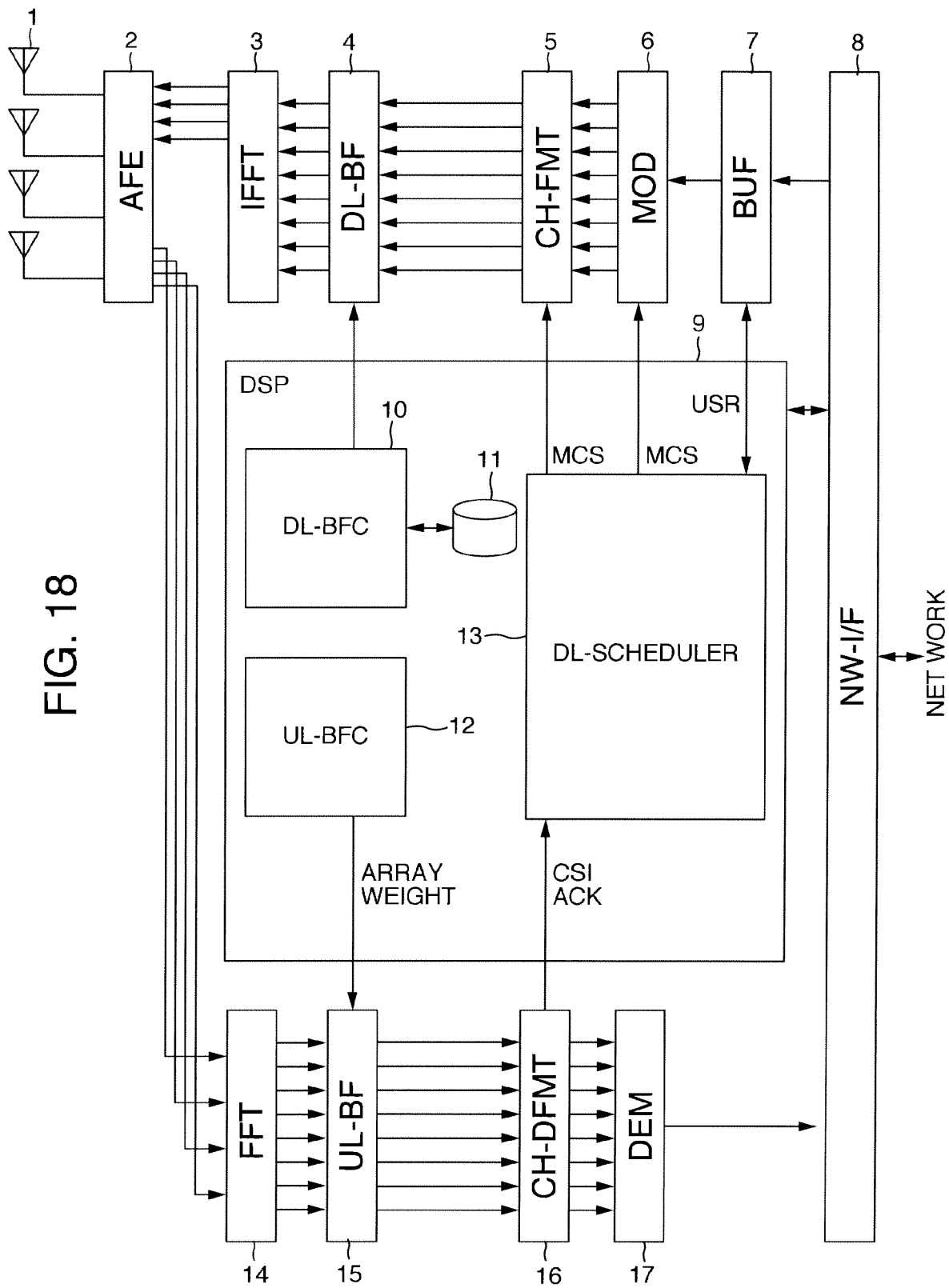
FIG. 18 is a diagram showing a configuration example of a signal processing part of a base station in an embodiment of the present invention.

In the new station column of antenna pattern allocation table 106, the Walsh function length $N_{BSt}$ and line number $L_{BSt}$ found above are registered (Step 407) and a command is given (Step 408) with respect to the new station via network interface part 107 and network 104 to carry out the antenna pattern allocation with a Walsh function of length $N_{BSt}$ and line number $L_{BSt}$. In FIG. 18, there is shown a configuration example of a signal processing part of a base station for implementing Embodiment 1.

The network interface of the base station receives antenna pattern allocation commands gradually sent from antenna pattern allocation table management part 105 of control station 103 via the network and information about the length and line number of the Walsh function used for the antenna pattern allocation of the base station. Network interface 8 inputs the received information to a DSP 9 carrying out control of the scheduler and the like.

The signal received by an antenna 1 is converted into a baseband signal in an analog front end 2 and is converted to the frequency domain in an FFT part 14 carrying out FFT computations with suitable timing. The frequency domain information is beam formed by means of adaptive control in an uplink beam forming part 15. However, even in the uplink, a fixed beam may be used. The array weights for beam forming are calculated by a beam forming control part 12. As for the signal whose interference has been reduced by beam forming, a pilot signal and the like are separated by means of a channel separation part 16, detection, de-mapping, and channel decoding are carried out by a decoding part 17, and the signal becomes user information. The obtained information is sent to the network via network interface 8. Channel separation part 16 also separates MAC information such as CSI, ACK, and the like, apart from the pilot signal. CSI is the downlink channel quality measured by the terminal. In CSI, it is reported which beam has good quality, which frequency has good quality and also, what the SINK (Signal to Interference+Noise Ratio) thereof are. "ACK" indicates the error detection result of the previously transmitted packet in the downlink circuit. These separated pieces of information are put to practical use as downlink quality information in a scheduler 13 which determines which user packet is allocated to each beam.

In accordance with commands from control station 103, DSP 9 defines beams to be transmitted at specific frequencies. In addition, it uses downlink quality information (CSI) reported from each user and, with corresponding beams of corresponding frequencies, selects users with good characteristics, and carries out scheduling to determine packet transmission. Also, in the scheduling, the modulation method (MCS: Modulation and Coding Scheme) of the information to be transmitted to the corresponding users is determined from SINR and ACK information, out of the pieces of quality information from the terminal.

The information about users for whom transmission has been decided is extracted from buffer 7 and is transferred to modulation block 6. In the modulation block, channel coding and modulation of the information is performed, in accordance with the modulation method decided by the packet scheduler. As for the modulated signal, additional signals such as a pilot signal for demodulation are added in channel forming part 5 and frame formatting is arranged. Information with completed frame formatting has fixed beam array weights attached by downlink beam forming part 4 and a beam such as shown in the example of FIG. 3 is formed into a signal that can be transmitted. The array weights attached at this stage for each antenna are ones selected by downlink beam forming control part 10. The array weights in this embodiment have a fixed value that is stored in a memory 11. In an IFFT part 3, a signal, which is the output of downlink beam forming part 4 and for which beam forming processing has been implemented for each antenna, becomes information for each antenna that is converted from frequency domain information into time domain information.

As explained in the foregoing, according to Embodiment 1, it is possible, in the case where a new station is added inside a wireless communication system, for the control station to easily carry out antenna pattern allocation with respect to existing base stations for which reallocation has become necessary due to the fact that the number of new stations and adjacent base stations has increased.

Second Embodiment

Next, Embodiment 2 will be described using FIG. 19.

In the present invention, the fact, accompanying the addition of a new station, of increasing the length N of the Walsh functions, increasing the antenna patterns, and carrying out a reallocation of antenna patterns to existing base stations for which the number of adjacent base stations has increased was also described in Embodiment 1. Since the antenna patterns are increased following the increase in the length N of the Walsh functions, in Embodiment 1, there was shown an embodiment in which the number of frequency divisions was doubled. In Embodiment 2, a description will be given regarding an embodiment in which antenna patterns are increased in the time axis direction without changing the number of frequency divisions.

Figure 19:
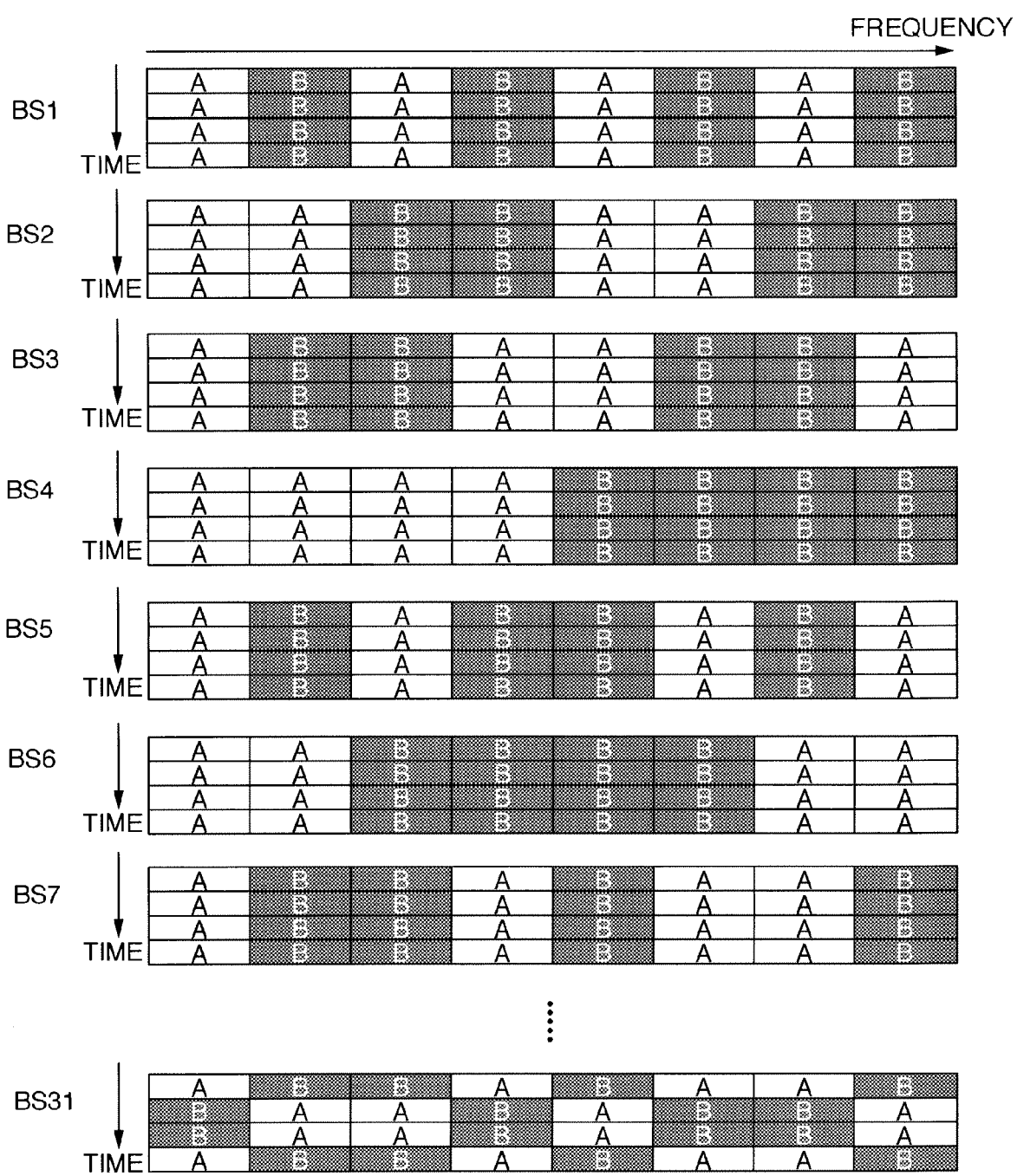
FIG. 19 is a diagram showing an example of allocating antenna patterns to multiple base stations in an embodiment of the present invention.

FIG. 19 is a diagram showing an example of an antenna pattern allocation to each base station in Embodiment 2.

In FIG. 19, the ordinate direction represents time and the abscissa direction represents frequency, the antenna pattern allocation for each time and frequency associated with each base station being indicated. In Embodiment 2, by changing the antenna patterns not only in the frequency direction but also in the time direction, an increase in antenna patterns accompanying an increase in the length N of the Walsh functions is handled without reducing the bandwidth.

In the example of FIG. 19, the example is shown using a Walsh function with a length N=32 and carrying out an allocation of eight channels in the frequency direction and four channels in the time direction. As mentioned above, it is possible to generate antenna patterns for 31 stations with an N=32 Walsh function. If these 32 channels are considered as one block, there necessarily exists for the user a frequency or time at which the influence due to interference beams from other stations is avoided at some frequency or time within the block by making the scheduling so that such a channel is selected, so the avoidance of influence of interference beams from other stations becomes possible. In other words, there is selected a Walsh function with a length N capable of generating a sufficiently larger number of antenna patterns than the number of cells adjacent to a certain base station so by carrying out antenna pattern allocation to each base station from a sufficiently large number of antenna patterns, the number of new stations and adjacent base stations increases with respect to base stations for which reallocation of antenna patterns is possible and antenna allocation is easily possible, even in the case where a new station is installed additionally.

In Embodiment 2, the selection of Walsh functions used for the allocation of antenna patterns to each base station (a line selection from a Walsh matrix) may be carried out by relating each base station with a uniquely allocated number. E.g., as a base station number, there is used a Physical Layer Cell Identity (below abbreviated as "PCI"), which is defined in 3GPP: "$3^{rd}$ Generation Partnership Project; Technical Specification Group Radio Access Network; Evolved Universal Terrestrial Radio Access (E-UTRA); Physical Channels and Modulation (Release 8)" TS 36.211 v8.6.0 (2009/3) 6.11

Synchronization signal", and allocation is carried out from a Walsh function with a length N=32 by the following formula:

$$W^{32}[PCI \bmod 31+1].$$

As described above, according to the present invention, it becomes possible to implement a new station installation in a state in which there is formed an SDMA antenna pattern in which a plurality of base stations are cooperating, antenna patterns between a new station and existing base stations to which the new station is adjacent possess orthogonality, and the orthogonality between existing base stations is also maintained.

In this way, if one tries to consider a user for whom interference from adjacent base stations is strong, signal transmission becomes possible based on a frequency or time at which the same interference is necessarily avoided, even after the installation of a new station, and, according to a combination with the scheduler, packet scheduling becomes possible in which strong interference from adjacent base stations is avoided.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wireless communication system having a plurality of base stations and a control station controlling said plurality of base stations;
wherein:
respective ones of said plurality of base stations are provided with an antenna having directivity and carry out transmission and reception of signals with patterns (below called "directivity patterns") for which a plurality of directions within the cell covered by the base station are specified;
said control station is configured to allocate to said plurality of base stations antenna patterns associated with directivity patterns for each of said plurality of frequency bands that can be used by the respective base stations and to transmit, to respective ones of said plurality of base stations, parameters for associating said allocated antenna patterns with directivity patterns for each of said plurality of frequency bands;
said plurality of base stations are configured to associate directivity patterns with the plurality of frequency bands on the basis of parameters received from the control station and to transmit and receive signals to and from an antenna in accordance with the associated directivity patterns; and
Walsh functions are used for the association of said antenna patterns with the directivity patterns, and the parameters transmitted from said control station to said plurality of respective base stations are Walsh function lengths and line numbers.

2. The wireless communication system according to claim 1, wherein:
said control station has a data table storing identity number and location information about the base station and a Walsh function length (N) and line number (L) regarding respective ones of said plurality of base stations; and,
in case a new base station is installed in the wireless communication system, is configured to receive identity number and location information about said new base station; and to register the same in said table;
to look up said table; and, with respect to the new base station, to find base stations adjacent to said new base station as well as the number $C_{BSn}$ of adjacent base stations, to find a minimum positive integer k which satisfies $C_{BSn}+2<=2^k$, and to set length of Walsh function to be applied to said new station $N_{BSt}=2^k$,
to look up said table and find the smallest line number $L_{BSt}$, excluding the line number allocated to the base station for which $N=N_{BSt}$ from among said adjacent base stations to said new station, and
to transmit $N_{BSt}$ and $L_{BSt}$ to said plurality of base stations.

3. The wireless communication system according to claim 1, wherein:
said control station has a data table storing identity number and location information about the base station and a Walsh function length (N) and line number (L) regarding respective ones of said plurality of base stations; and,
in case a new base station is installed in the wireless communication system, said control station is configured to receive the input of an identity number and location information about said new base station; and to register the same in said table;
to look up said table; and, with respect to respective ones of the base stations adjacent to the new base station, to find the adjacent base stations and the number $C_{BSn}$ of adjacent base stations after the new base station has been installed;
to find a minimum positive integer k which satisfies $C_{BSn}+2<=2^k$, to set length of Walsh function to be applied to said new station $N_{BSt}=2^k$, and
to look up said table in case $N_{BSt}$ is equal to the length of the Walsh function currently being applied, to continuously use the currently applied antenna patterns, and in case $N_{BSt}$ is not equal to the length of the Walsh function currently being applied, to find the smallest line number $L_{BSt}$ excluding the line number that is allocated to the base station for which $N=N_{BSt}$ from among said adjacent base stations, to set line number of Walsh function to be applied to said new station be $L_{BSt}$ and to transmit $N_{BSt}$ and $L_{BSt}$ to said plurality of base stations.

4. The wireless communication system according to claim 1, wherein said antenna patterns are, in addition to a plurality of frequency bands, also allocated on the time axis.

5. The wireless communication system according to claim 4, wherein a sufficiently large value is used as said length of Walsh function and said line number of Walsh function is set on the basis of the identity number of said base station.

6. A wireless communication method associated with a wireless communication system having a plurality of base stations and a control station controlling said plurality of base stations; wherein:
if said control station allocates to said plurality of base stations antenna patterns associated with directivity patterns for each of said plurality of frequency bands that can be used by the respective base stations and transmits, to respective ones of said plurality of base stations, parameters for associating said allocated antenna patterns with directivity patterns for each of said plurality of frequency bands;
said plurality of base stations associate directivity patterns with the plurality of frequency bands on the basis of parameters received from the control station and transmits and receives signals to and from an antenna in accordance with the associated directivity patterns; and
Walsh functions are used for the association of said antenna patterns with the directivity patterns, and the parameters transmitted from said control station to said plurality of respective base stations are Walsh function lengths and line numbers.

7. The wireless communication method according to claim 6, wherein
a table which comprises identity number and location information about the base station and a Walsh function length (N) and line number (L) is stored in said control station regarding respective ones of said plurality of base stations; and
if, in case a new base station is installed in the wireless communication system, the input of the identity number and location information about said new base station is received;
then, with respect to the new base station, base stations adjacent to said new base station as well as the number $C_{BSn}$ of adjacent base stations are found, a minimum positive integer k which satisfies $C_{BSn}+2<=2^k$ is found, length of Walsh function to be applied to said new station is set to $N_{BSt}=2^k$,
said table is looked up and the smallest line number $L_{BSt}$, excluding the line number allocated to the base station for which $N=N_{BSt}$, is found from among said adjacent base stations to said new station, $L_{BSt}$ is set to be line number of Walsh function to be applied to said new station, and $N_{BSt}$ and $L_{BSt}$ are transmitted to said plurality of base stations.

8. The wireless communication method according to claim 6, wherein
a table which comprises identity number and location information about the base station and a Walsh function length (N) and line number (L) is stored in said control station regarding respective ones of said plurality of base stations; and
if, in case a new base station is installed in the wireless communication system, the input of the identity number and location information about said new base station is received;
the adjacent base stations and the number $C_{BSn}$ of adjacent base stations are found with respect to respective ones of the base stations adjacent to the new base station after the new base station has been installed;
a minimum positive integer k which satisfies $C_{BSn}+2<=2^k$ is found, length of Walsh function to be applied to said new station is set to $N_{BSt}=2^k$,
said table is looked up and in case $N_{BSt}$ is equal to the length of the Walsh function currently being applied, continuously uses the currently applied antenna patterns, and in case $N_{BSt}$ is not equal to the length of the Walsh function currently being applied, the smallest line number $L_{BSt}$ excluding the line number that is allocated to the base station for which $N=N_{BSt}$ is found from among said adjacent base stations; $L_{BSt}$ is set to be line number of Walsh function to be applied to said new station, and $N_{BSt}$ and $L_{BSt}$ are transmitted to said plurality of base stations.

9. The wireless communication method according to claim 6, wherein said antenna patterns are, in addition to a plurality of frequency bands, also allocated on the time axis.

10. The wireless communication method according to claim 9, wherein a sufficiently large value is used as said length of Walsh function and said line number of Walsh function is set on the basis of the identity number of said base station.

11. A control station carrying out control of a plurality of base stations, wherein:
respective ones of said plurality of base stations are provided with an antenna having directivity and signal transmission and reception is carried out with patterns (below called "directivity patterns") defined in a plurality of directions inside the cell covered by the base station; and
the control station has an antenna pattern allocation table and, when allocating to said plurality of base stations antenna patterns associated with directivity patterns for each of the plurality of frequency bands and/or each of the plurality of time bands that can be utilized by the respective base stations, is configured to use Walsh functions for the association of said antenna patterns with the directivity patterns; to store and to manage in said antenna pattern allocation table a base station identity number and location information and the Walsh function length (N) and line number (L) corresponding to the allocated antenna patterns, for respective ones of said plurality of base stations; and
to transmit, to respective ones of said plurality of base stations, an antenna allocation command and the Walsh function length and line number corresponding to the antenna patterns.

12. A base station provided with an antenna having directivity and carrying out signal transmission and reception with patterns (below called "directivity patterns") defined in a plurality of directions inside the cell covered by the base station; and,
on the basis of control from a control station controlling the base station, the base station is configured to change said directivity patterns for each of the plurality of frequency bands and/or each of the plurality of time bands that can be utilized by said base station, wherein said directivity pattern determination is carried out using Walsh functions; and said base station is configured to:
receive the length and line number of the Walsh functions from said control station;
associate said Walsh function length and line number with directivity patterns for each of the plurality of frequency bands and/or each of the plurality of time bands; and
carry out transmission of signals from the antenna and reception of signals to the antenna on the basis of the associated directivity patterns.

* * * * *